US008554081B2

(12) United States Patent
Kovsh et al.

(10) Patent No.: US 8,554,081 B2
(45) Date of Patent: Oct. 8, 2013

(54) OPTICAL ADD/DROP MULTIPLEXER INCLUDING RECONFIGURABLE FILTERS AND SYSTEM INCLUDING THE SAME

(75) Inventors: Dmitriy I. Kovsh, Hoboken, NJ (US); Ekaterina A. Golovchenko, Colts Neck, NJ (US); Stuart M. Abbott, Marlboro, NJ (US)

(73) Assignee: Tyco Electronics Subsea Communications, LLC, Eatontown, NJ (US)

( * ) Notice: Subject to any disclaimer, the term of this patent is extended or adjusted under 35 U.S.C. 154(b) by 666 days.

(21) Appl. No.: 12/169,769

(22) Filed: Jul. 9, 2008

(65) Prior Publication Data
US 2010/0008672 A1 Jan. 14, 2010

(51) Int. Cl.
*H04B 10/00* (2006.01)
(52) U.S. Cl.
USPC ............................................. 398/83; 398/181
(58) Field of Classification Search
USPC ............................................. 398/83, 173–181
See application file for complete search history.

(56) References Cited

U.S. PATENT DOCUMENTS

| | | | | |
|---|---|---|---|---|
| 5,600,473 | A * | 2/1997 | Huber | 398/87 |
| 5,926,590 | A * | 7/1999 | Mao | 385/24 |
| 6,025,941 | A * | 2/2000 | Srivastava et al. | 398/7 |
| 6,538,782 | B1 * | 3/2003 | Otsuka et al. | 398/82 |
| 6,647,211 | B2 * | 11/2003 | Terahara et al. | 398/106 |
| 6,661,946 | B2 * | 12/2003 | Caroli et al. | 385/24 |
| 6,885,820 | B2 * | 4/2005 | Eder et al. | 398/26 |
| 6,904,438 | B2 * | 6/2005 | Harris et al. | 1/1 |
| 7,058,301 | B2 * | 6/2006 | Bosloy et al. | 398/38 |
| 7,061,664 | B2 | 6/2006 | Aso et al. | |
| 7,106,969 | B1 * | 9/2006 | Lichtman et al. | 398/59 |
| 7,110,638 | B2 * | 9/2006 | Frankel | 385/24 |
| 7,136,586 | B2 * | 11/2006 | Sharratt et al. | 398/48 |
| 7,142,785 | B2 * | 11/2006 | Otsuka et al. | 398/85 |
| 7,184,666 | B1 * | 2/2007 | Li et al. | 398/83 |
| 7,248,799 | B2 * | 7/2007 | Faure et al. | 398/38 |
| 7,336,901 | B1 * | 2/2008 | Soulliere | 398/94 |
| 7,343,102 | B2 | 3/2008 | Tomofuji et al. | |
| 7,376,355 | B2 * | 5/2008 | Ota | 398/167 |
| 7,483,637 | B2 * | 1/2009 | Gumaste et al. | 398/83 |
| 7,627,244 | B2 * | 12/2009 | Fujita | 398/19 |

(Continued)

FOREIGN PATENT DOCUMENTS

| | | |
|---|---|---|
| JP | H09-289488 A | 11/1997 |
| JP | H11-202374 A | 7/1999 |
| JP | H11-275616 A | 10/1999 |
| JP | 2000-078176 A | 3/2000 |

OTHER PUBLICATIONS

International Search Report and Written Opinion dated Sep. 3, 2009 issued in related International Patent Application No. PCT/US2009/049882.

(Continued)

*Primary Examiner* — Agustin Bello (57) ABSTRACT

An optical add/drop multiplexer (OADM) and system incorporating the same for maintaining loading of WDM channels with loading signals or information signals when signals are added or dropped. The OADM may include reconfigurable band pass filters having a transmittance characteristic controllable using a command signal. Selective filtering of loading signals and/or information signals received from branch and trunk paths allows an output WDM signal including information signals on utilized channels and loading signals on all unutilized channels.

18 Claims, 4 Drawing Sheets

(56) References Cited

U.S. PATENT DOCUMENTS

| | | | |
|---|---|---|---|
| 7,650,075 B2 * | 1/2010 | Kikuchi | 398/83 |
| 7,653,311 B2 * | 1/2010 | Kikuchi et al. | 398/83 |
| 7,734,174 B2 * | 6/2010 | Beckett et al. | 398/32 |
| 7,813,642 B2 * | 10/2010 | Muro et al. | 398/95 |
| 7,826,746 B2 * | 11/2010 | Stango et al. | 398/79 |
| 2003/0002104 A1 * | 1/2003 | Caroli et al. | 359/127 |
| 2003/0058497 A1 * | 3/2003 | Park et al. | 359/127 |
| 2003/0099475 A1 * | 5/2003 | Nemoto et al. | 398/83 |
| 2005/0286905 A1 | 12/2005 | Mohs et al. | |
| 2006/0051093 A1 | 3/2006 | Manna | |
| 2009/0028567 A1 * | 1/2009 | Socci et al. | 398/85 |
| 2009/0226172 A1 * | 9/2009 | Larikova et al. | 398/83 |
| 2010/0028008 A1 * | 2/2010 | Nakajima | 398/83 |

OTHER PUBLICATIONS

Office Action issued in corresponding Japanese Patent Application No. 2011-517552 on Jul. 23, 2013.

* cited by examiner

OPTICAL ADD/DROP MULTIPLEXER INCLUDING RECONFIGURABLE FILTERS AND SYSTEM INCLUDING THE SAME

TECHNICAL FIELD

The present disclosure relates to optical transmission systems, and, in particular, to an optical add/drop multiplexer including reconfigurable filters and a system including the same.

BACKGROUND

To maximize the transmission capacity of an optical fiber transmission system, a single optical fiber may be used to carry multiple optical signals in what is called a wavelength division multiplexed system (hereinafter a WDM system). Modern WDM systems have a high traffic capacity, for example, a capacity to carry 64 channels at 10 gigabits per second (hereinafter Gb/s).

The optical fiber transmission system may include a relatively long trunk segment that may be terminated at a transmitting and/or receiving trunk terminal. The optical fiber transmission system may further include one or more branching units situated along its trunk. Each branching unit (BU) may be connected to a branch segment that terminates in a transmitting and/or receiving branch terminal. Each BU may include one or more optical add/drop multiplexers (OADM). Channels may be added to and/or dropped from the trunk segment of the optical transmission system via the OADMs. Accordingly, the system may be dynamically loaded and unloaded with signal channels as they are added and/or dropped at the BUs.

When the information channels are transmitted over long distances or between links of optical fiber cable, one or more amplifiers may be provided to compensate for signal attenuation. The amplifiers used in some WDM systems cannot easily be modified, and may be initially configured to support a fully loaded link (e.g., 64 channels, each channel carrying 10 Gb/s). In general, it may be desirable that the power per channel be sufficient to provide an adequate signal-to-noise ratio in the presence of the amplified spontaneous emission (ASE) noise from the amplifiers, necessitating a high amplifier total output power for systems with high fully-loaded capacity. The amplifiers may thus be configured to provide an optical output signal at a nominal total optical power.

The nominal amplifier output power level may be insensitive to the power at the input of the amplifier. As the amplifier input power varies over a wide range, the total amplifier output power may change very little around the nominal output power level. As additional channels are added, e.g. at a branching unit, the optical output power per channel may decrease. As channels are dropped, the optical output power per channel may increase.

In a fiber optical communication network the fiber medium is non-linear. At high optical powers (e.g., more than 10 mW per channel), the optical signal may experience more distortion than at low optical powers (e.g., less than 1.0 mW per channel) which results in transmission penalty. Therefore when channels are dropped the value of optical channel power may increase, and network communication performance may suffer. Partial channel loading of a chain of optical amplifiers may result in undesirable noise accumulation and gain reshaping effects that also degrade channel performance

BRIEF DESCRIPTION OF THE DRAWINGS

Reference should be made to the following detailed description which should be read in conjunction with the following figures, wherein like numerals represent like parts.

DETAILED DESCRIPTION

Figure 1:
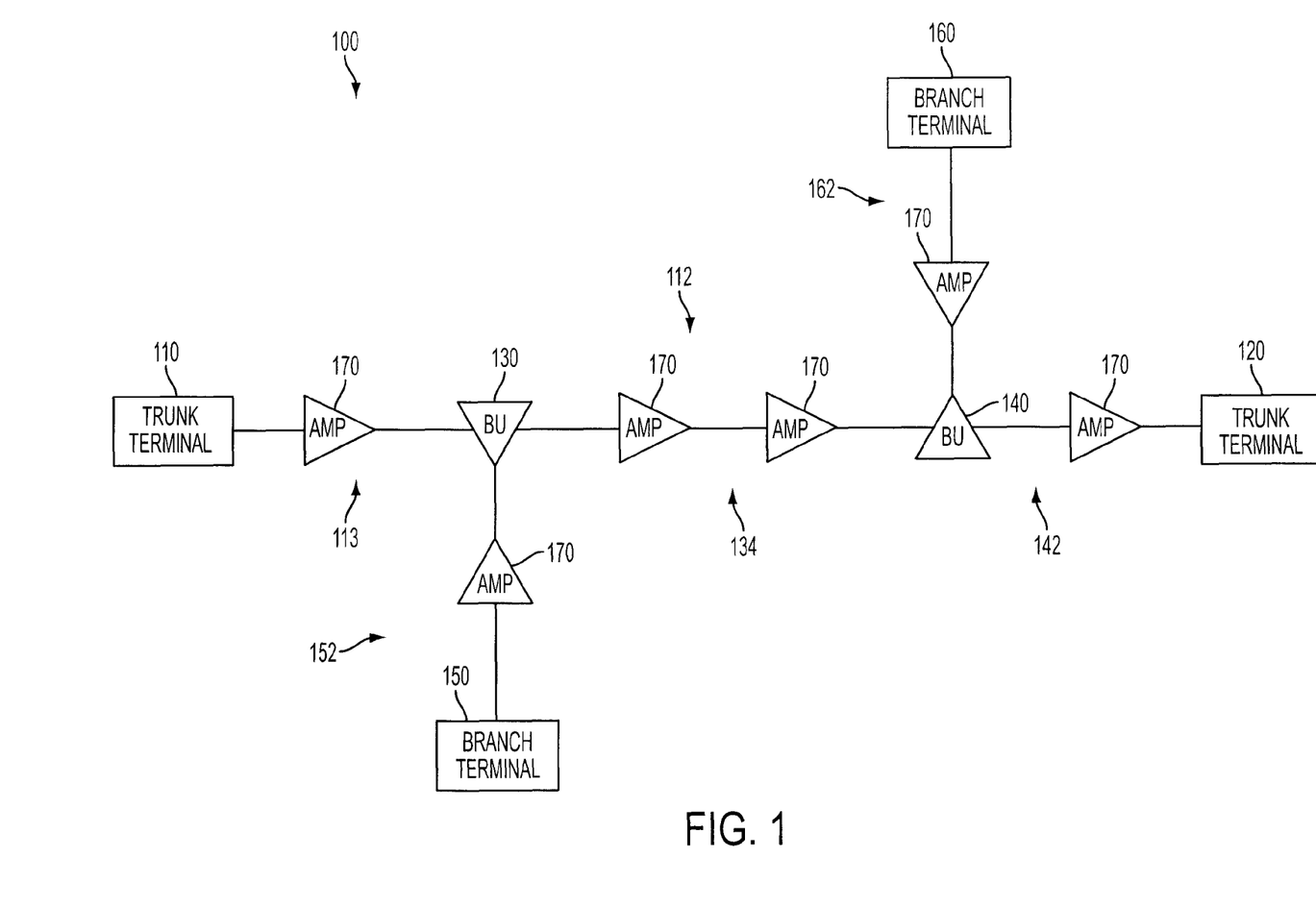
FIG. 1 is a schematic illustration of an optical communication system consistent with the present disclosure.

Turning now to FIG. 1, there is illustrated an exemplary optical communication system 100 consistent with the present disclosure. Those skilled in the art will recognize that the system 100 has been depicted in highly simplified form for ease of explanation. The optical communication system 100 includes trunk terminals 110 and 120 coupled to a trunk path 112. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 112 may include a plurality of optical cable segments, e.g. cable segments 113, 134, 142, for carrying optical signals. Each cable segment may include one or more sections of optical fiber cable including optical fiber pairs and one or more repeaters 170 to provide a transmission path for bi-directional communication of optical signals between trunk terminal 110 and trunk terminal 120.

One or more branching units, e.g., branching units 130 and 140, may be coupled to the trunk path between the trunk terminals 110, 120. Each branching unit 130, 140 may be further coupled to a branch terminal, e.g., branch terminals 150 and 160, respectively, through an associated branch path 152, 162, respectively, perhaps through one or more repeaters 170 and linking optical cables. The system 100 may therefore be configured to provide bi-directional communication of optical signals between terminals 110, 120, 150 and/or 160. For ease of explanation the description herein may refer to transmission from one terminal to another. It is to be understood, however, that the system 100 may be configured for bi-directional or uni-directional communication between any of the terminals 110, 120, 150 and/or 160.

The components in the trunk and branch paths may include known configurations for achieving their intended functionality. The repeaters 170, for example, may include any known optical amplifier/repeater configuration that compensates for signal attenuation on the transmission path. For example, one or more of the repeaters may be configured as an optical amplifier, such as an erbium doped fiber amplifier, a Raman amplifier, or a hybrid Raman/EDFA amplifier. Also, one or more of the repeaters may be provided in a known optical-electrical-optical configuration that regenerates an optical signal by converting it to an electrical signal, processing the electrical signal and then retransmitting the optical signal.

System 100 may be configured as a long-haul system, e.g. having a length between at least two of the terminals of more than about 600 km, and may span a body of water. When used to span a body of water, e.g. an ocean, amplifiers 170 and/or branching units 130 and/or 140 may be seated on the ocean floor and the trunk path 112 path may span between beach landings. It will be appreciated that a plurality of repeaters, branching units and optical media links may be disposed beneath water and/or over land.

An optical information signal may originate at one or more of the trunk and/or branch terminals. Each branching unit 130, 140 may be configured to add and/or drop one or more information signals using, for example, an optical add/drop multiplexer (OADM). Whether a particular information signal is added and/or dropped may change dynamically.

For example, a WDM signal that originates at trunk terminal 110 may include one or more information signals that may occupy one or more channels. Likewise, WDM signal that originates at branch terminal 150 may also include one or more information signals. Both WDM signals may be transmitted to branching unit 130. Branching unit 130 may be configured to drop, i.e. extract, one or more information signals originating from the trunk terminal 110 and pass the dropped signals to the branch terminal 150. Branching unit 130 may also or alternatively be configured to add, i.e. insert, one or more information signals originating from branch terminal 150 to at least a portion of the WDM signal originating from the trunk terminal 110 and pass the resulting WDM optical signal, i.e. including the added information signals, onto segment 134. The resulting WDM optical signal may be received by branching unit 140. Branching unit 140 may similarly add and/or drop information signals. It will be appreciated that information signals that originate at terminal 120 and/or branch terminal 160 may be likewise added and/or dropped at branching unit 140 with a resulting optical signal transmitted to branching unit 130. Branching unit 130 may similarly add and/or drop information signals and pass a resulting optical signal to terminal 110.

In a WDM system, if one or more information signals are dropped at a branching unit, leaving some of the channels unutilized the remaining utilized channels may draw all of the power of the fiber amplifiers in the repeaters. The utilized channels can thus propagate through a portion or all of the system with excessive power per channel, leading to degradation in the received signal due to fiber non-linearities. As used herein, "utilized channels" shall refer to WDM system channels carrying information signals on the system, and "unutilized channels" shall refer to WDM system channel locations that do not contain information carrying signals.

Generally, systems and methods consistent with the present disclosure address this issue by loading unutilized channels at the trunk and branch terminals with loading signals, and then adding or removing loading signals from the parts of the transmission band in the branching units to allow for channels being dropped or added by the branching units. As used herein "loading signal" shall refer to a non-information carrying signal such as broadband noise, e.g. ASE noise, or a dummy tone. As used herein "dummy tones" shall refer to optical energy that is centered on a specific wavelength and that does not carry information or traffic. The entire transmission band entering and exiting the branching units may, therefore, be uniformly loaded with either loading signals or information signals. In one embodiment, the loading signals may be loaded onto unutilized channels at about the same optical power as the information signals on the utilized channels. The loading signals may, therefore, draw a proportionate share of repeater power similar to the share drawn by the information signals, thereby avoiding the deleterious effects of transmitting unloaded parts of the band.

Loading signals may be generated and added to unutilized channels at the trunk and branch terminals by methods known to those of ordinary skill in the art. In an embodiment where one or more loading signals are broadband noise, the noise may be generated and added to unutilized channels, for example, as disclosed in U.S. Patent Application Publication Number 2005/0286905 A1, entitled "Optical Fiber Transmission System with Noise Loading", published Dec. 29, 2005, the teachings of which are hereby fully incorporated herein by reference. For example, broadband noise may be generated by an amplifier and added to unutilized channels using appropriate filters and couplers. The amplifier, which may be a rare earth-doped fiber amplifier, may be configured to provide a substantially constant output power independent of input power. If the amplifiers inputs are unloaded or minimally loaded, the amplifier may generate ASE noise. The ASE noise may be added to WDM signals to be broadband, i.e. extending across the system bandwidth, and/or may be filtered resulting in ASE noise occupying one or more bands, sub-bands and/or channels within the system bandwidth. In an embodiment where one or more loading signals are dummy tones, the dummy tones may be generated, for example, by filtering noise, such as amplified spontaneous emission (ASE) noise, or by using a continuous-wave non-modulated laser source, as described for example in U.S. Patent Application Publication No. 2006/0051093, the teachings of which are hereby fully incorporated herein by reference.

Figure 2:
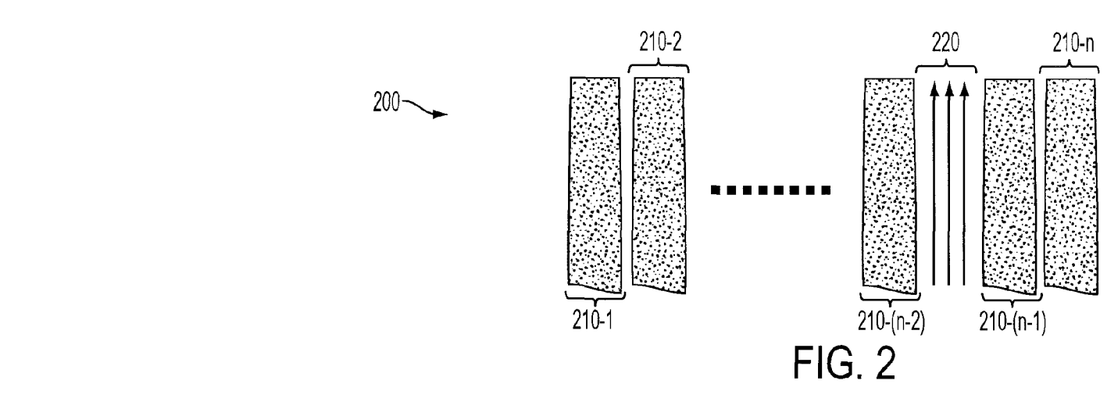
FIG. 2 is a pictorial illustration of an optical spectrum showing loading signal bands and a band that includes information signals consistent with the present disclosure.

FIG. 2 diagrammatically illustrates the transmission spectrum 200 of a WDM signal transmitted from a trunk 110, 120 or branch 150, 160 terminal in a system 100 consistent with the present disclosure. As shown, the transmission spectrum may include one or more loading signal bands 210-1 . . . 210-n occupying unutilized channels and/or one or more information signals 220 occupying utilized channels. The loading signal bands 210-1 . . . 210-n may extend across multiple unutilized channels and may be limited by appropriate filters within the branch and trunk terminals to the unutilized channels.

Each branching unit 130, 140 may be configured to add and/or drop one or more information signals. Whether an information signal is added and/or dropped may change dynamically. When an information signal is added, it may be added to a channel that has been previously loaded with a loading signal. It may therefore be desirable to filter (i.e., remove) the loading signal at the channel where the information signal is to be added. When an information signal is dropped, it may be desirable to replace the dropped signal with a loading signal to maintain uniform loading. Accordingly, it may be desirable to dynamically adjust the power level of loading and/or information signals at a branching unit.

In one embodiment consistent with the present disclosure, a branching unit may include an optical add/drop multiplexer (OADM). The branching unit and/or the OADM may include one or more reconfigurable band pass filters (BPF) to control power level of loading signals and/or information signals. One exemplary embodiment of a BFF 300 useful in a system consistent with the present disclosure is diagrammatically illustrated in FIG. 3. The filter 300 may be a band pass filter (BPF) including first 310 and second 320 matched 3-port filters, and one or more variable optical amplifiers (VOA), e.g., VOAs 330 and 332, coupled between the 3-port filters 310, 320. A variety of configurations for the filters 310, 320 and variable optical attenuators 330, 332 are known to those of ordinary skill in the art.

Figure 3:
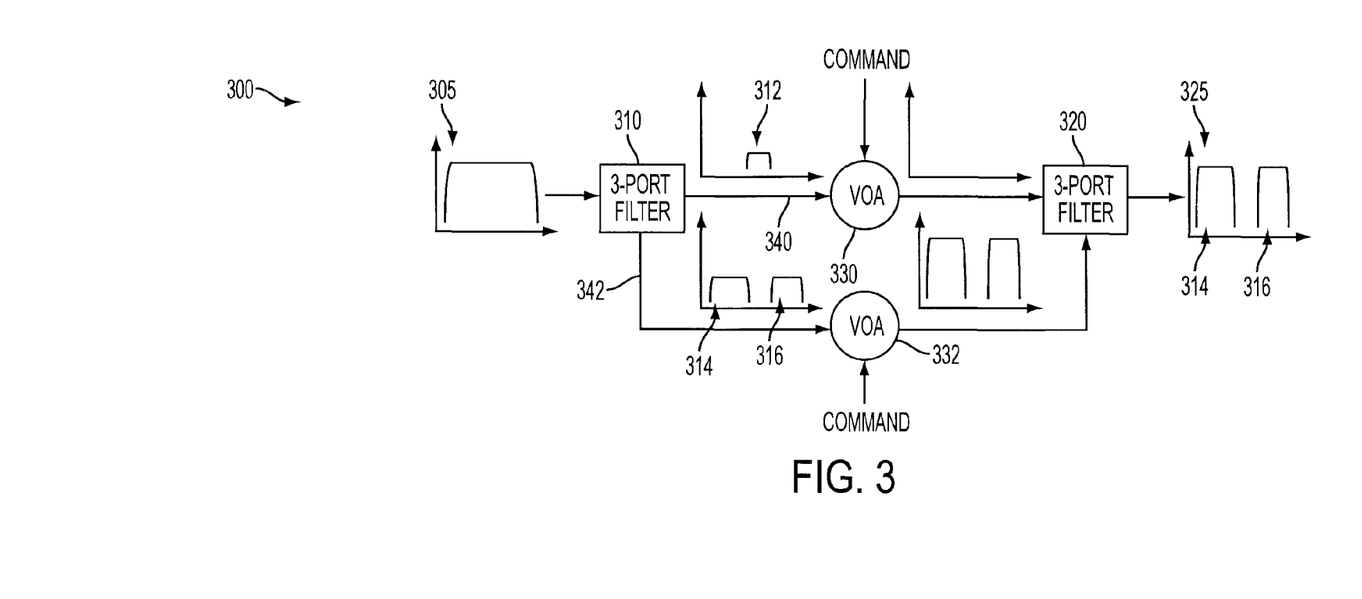
FIG. 3 is an example of an embodiment of a band pass filter consistent with the present disclosure.

A band of wavelengths 305 may be provided to an input port of the first 3-port filter 310. The 3-port filter 310 may filter the signal 305 into sub-bands 312, 314, 316 and provide the sub-bands on separate paths 340, 342. In the illustrated exemplary embodiment, the sub-band 312 corresponds to a band of wavelengths disposed between the sub-bands 314 and 316. The sub-band 312 is provided on path 340 and the sub-bands 314 and 316 are provided on path 342.

The VOAs coupled to the paths 340, 342 may allow for selective amplification (or attenuation) of the signals on the associated paths. Command signals may be provided to the VOAs 330, 332 to set the VOAs 330, 332 to desired amplification levels. In the illustrated exemplary, embodiment, the VOA 330 is configured to attenuate signals in the band 312 and the VOA 332 is configured to amplify the signals in bands 314 and 316. It is to be understood, however, that either or both amplifiers may be configured to amplify or attenuate the signals, thereby allowing selective amplification or attenuation of signals within the bands 312, 314 and 316.

The outputs of the VOAs 330, 332 may be coupled to respective inputs of the 3-port filter 320 and combined by the filter 320 at an output thereof. In the illustrated exemplary embodiment, the output of the filter 320 includes only the sub-bands 314 and 316 since the wavelengths in band 312 were attenuated by VOA 330. The transmittance of the filter 300 may thus be controlled by selectively setting the amplification of the VOAs 330, 332. Multiple filters, such as filter 300, with different matching 3-port filter configurations, may be stacked in series for selectively controlling transmittance of an input signal through the stacked series of filters to allow transmittance of any number of selected wavelength bands (filled with loading or information signals). Consistent with the present disclosure, bands that are attenuated may be filled with information signals added by the associated branching unit.

Figure 4:
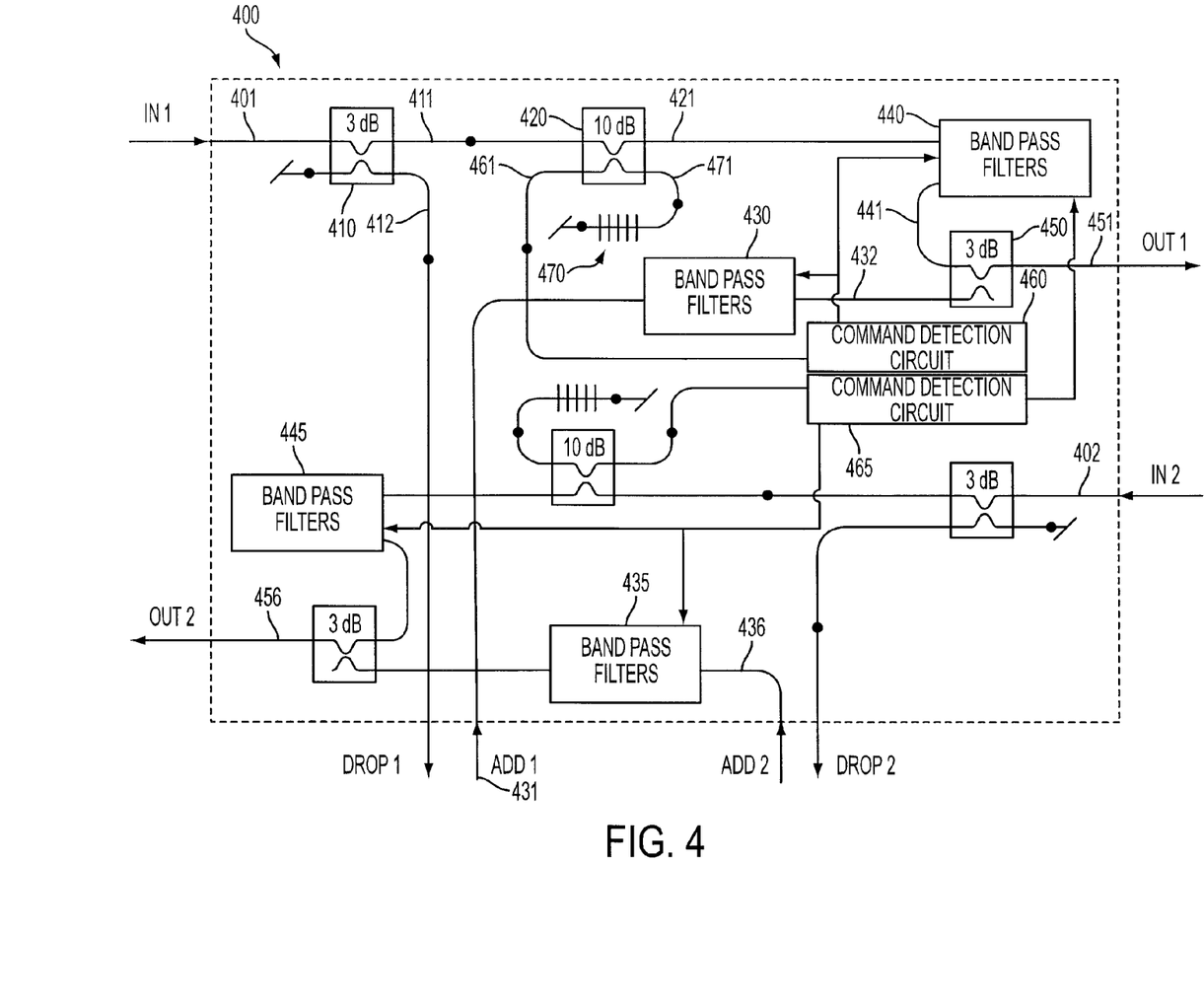
FIG. 4 is a schematic illustration of an embodiment of an OADM including reconfigurable filters consistent with the present disclosure.

FIG. 4 depicts an example of an OADM 400 useful in a branching unit consistent with the present disclosure and including sets of reconfigurable BPFs 430, 440, 435, 445. Each set of BPFs may include one or more filters, e.g. stacked series, for selectively controlling transmittance through the set of BPFs, e.g. as shown and described in connection with the exemplary embodiment of FIG. 3. Although FIG. 4 depicts the sets of reconfigurable BPFs within the OADM 400, one or more sets of BPFs may be included in a branching unit but not within an OADM. Accordingly, FIG. 4 depicts but one possible configuration of an OADM with reconfigurable BPFs. Also, for ease of explanation, FIG. 4 illustrates adding information signals and removing loading signals to accommodate the added information signals. It is to be understood, however, that information signals may similarly be dropped and loading signals may be added to maintain channel uniform loading of the transmission band.

Figure 5:
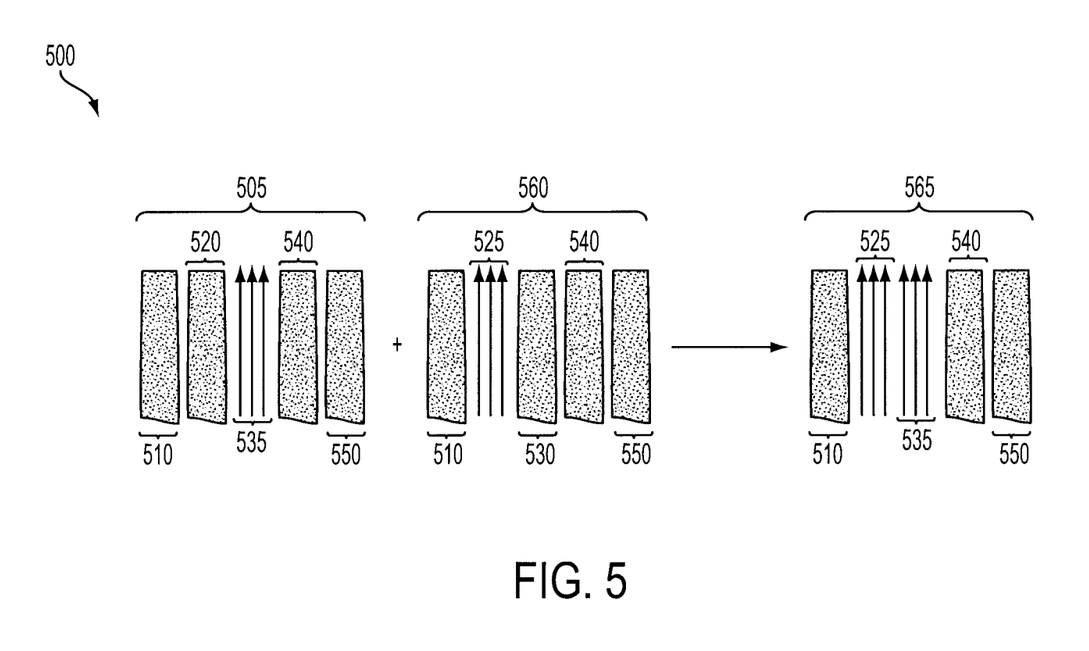
FIG. 5 is a pictorial illustration of adding information signals consistent with the present disclosure.

FIG. 4 may be better understood with reference to FIG. 5. FIG. 5 includes a pictorial representation of optical spectra illustrating the addition of a first WDM optical signal 505 and a second WDM optical signal 560 and the resulting combined WDM optical signal 565. In one embodiment, the first WDM optical signal 505 may be transmitted from a transmitter to a branching unit. The second WDM optical signal 560 may be transmitted from a branch terminal to the branching unit. The resulting combined optical signal 565 may then be transmitted from the branching unit to a second branching unit and/or a receiver.

The first WDM optical signal 505 may include a plurality sub-bands 510, 520, 540, 550 including unutilized channels loaded with loading signals, and one or more sub-bands 535 including utilized channels. The second WDM optical signal 560 may include a plurality sub-bands 510, 530, 540, 550 including unutilized channels loaded with loading signals, and one or more sub-bands 525 including one or more utilized channels. It will be appreciated by those of ordinary skill in the art that an actual optical spectra may include additional utilized and unutilized channels, sub-bands and/or bands. The spectra depicted in FIG. 5 are simplified for ease of explanation.

With continued reference to FIGS. 4 and 5, the second WDM optical signal 560 may be received at an input (Add_1) 431 and may be provided to a branch set of reconfigurable BPFs 430. The first WDM optical signal 505 may be received at a first input (In_1) 401 of the OADM 400 and provided to a coupler 410, e.g. a 3 dB coupler. The coupler may have a first output 412 for dropping one or more channels of the first WDM signal, and a second output coupled to a second coupler 420, e.g. a 10 dB coupler. A first output 421 of the coupler 420 may be coupled to a set of reconfigurable BPFs 440.

The first WDM optical signal 505 may include a utilized channel carrying a command signal modulated on its associated channel wavelength according to any known modulation technique and format. A second output 471 of the coupler 420 may be coupled to a fiber grating 470 configured to reflect only a wavelength associated with the command signal. The command signal wavelength may be reflected back through coupler 420 on path 461 and to a command detection circuit 460.

The command detection circuit 460 may be configured to demodulate the command signal in a known manner and provide an associated output to the BPFs 430 and 440 to configure the BPFs 430 and 440 to filter appropriate bands from the Add_1 and In_1 inputs and adjust powers of such bands so that when the inputs are combined to provide an output signal at Out_1 the output is loaded, e.g. uniformly, with either loading signals or information signals at all channel locations. For example, the command signal may have a binary word modulated thereon, and the output of the command detection circuit 460 may be a binary electrical signal including a bit associated with each filter of an associated set of reconfigurable BPFs. Each bit may, for example, cause an associated VOA to impart an associated amplification or attenuation to an associated band of wavelengths. Selection of the binary word modulated on the command signal may, therefore, allow selective modification of the transmittance characteristic of the set of reconfigurable BPFs. Those of ordinary skill in the art will recognize that other methods of selectively controlling the transmittance characteristics of at least one BPF using a command signal may be implemented.

Referring to FIG. 5, for example, the first WDM optical signal 505 may include loading signal(s) in a channel and/or sub-band 520 corresponding to a sub-band 525 of the second WDM optical signal that includes information signals. The second WDM optical signal 560 may include loading signal(s) in a channel and/or sub-band 530 corresponding to a sub-band 535 of the first WDM optical signal that includes information signals. In response to the command from the command detection circuit 460, the set of reconfigurable BPFs 430 may be configured to stop or block loading signal(s) in the band 530 and the set of reconfigurable BPFs 440 may be configured to stop or block loading signal(s) in the band 520. For example, a VOA in a BPF of the set of BPFs 430 may be commanded to attenuate the band 530 and a VOA in a BPF in the set of BPFs 440 may be commanded to attenuate loading signal(s) in the band 520.

The outputs 432, 441 of the sets of BPFs 430 440 may be coupled to a coupler 450. The coupler 450 may couple (i.e., combine) the filtered first optical signal at the output 441 and the filtered second optical signal at the output 432 and provide the combined WDM optical signal 565 at a first output port (Out_1) 451. Referring again to FIG. 5, the combined optical signal may include bands 510, 540, and 550 of unutilized channels containing loading signals and bands 525 and 535 of utilized channels containing information signals 525 and 535. All channels in the combined WDM optical signal 565 include either loading signals or information signals. This signal 565 may be transmitted to a second branching unit and/or receiver.

As shown in FIG. 4, the OADM 400 may be bidirectional and may include similar functionality for signals propagating in the opposite direction, e.g., In_2 402, Add_2 436 and Out_2 456. Sets of BPFs 435, 445 may be configured for selectively filtering the signals in response to a command detected by command detection circuitry 465. Accordingly, the OADM 400 may be configured to dynamically load dropped information signal channels with loading signals and/or block loading signals on added information signal channels, bi-directionally. Also, although the illustrated exemplary embodiment shows the command signal received from the In_1 port, i.e. from a trunk terminal, those of ordinary skill in the art will recognize that the command signal may be provided from any terminal with corresponding modification of the OADM to route the command signal to the appropriate command signal detection circuit.

It will be appreciated by those skilled in the art that an optical communication network may include a plurality of branching units and/or OADMs. Each branching unit and/or OADM may include one or more sets of reconfigurable BPFs. It may be desirable that the BPFs be matched so that the pass and/or stop bands are aligned so that an information signal that propagates through multiple branching units is not degraded. It may also be desirable that the BPF bandwidths be sufficiently narrow to pass and/or stop a single information signal channel.

An OADM with sets of reconfigurable BPFs may be useful in a fault situation. For example, a cable break may result in an amplifier, e.g. one of amplifiers 170, having unloaded inputs. In such a circumstance, the amplifier may generate broadband ASE noise that may propagate. An OADM consistent with the present disclosure may receive the broadband ASE noise signal. The noise signal may then be incident on a set of reconfigurable BPFs. An output signal of the sets of reconfigurable BPFs may then include band-limited ASE noise (loading signals) on unutilized channels and/or sub-bands. The output signal may further include utilized channels containing information signals with the incident ASE noise filtered (stopped) by the sets of reconfigurable BPFs.

A variety of other OADM configurations are possible. In one embodiment, for example, the band pass filters may be configured as a single VOA coupled to a filter that passes entire transmission band. With this configuration, the relative power ratio of the signals combined at the OADM may be controlled to ensure the balanced power per channel at the output 451.

According to one aspect of the present disclosure, there is provided a wavelength division multiplexed (WDM) optical system including: a trunk terminal configured to provide a WDM trunk signal on a trunk path, the trunk signal including at least one trunk signal utilized channel and at least one trunk signal unutilized channel; a branch terminal configured to provide a WDM branch signal on a branch path, the branch signal including at least one branch signal utilized channel and at least one branch signal unutilized channel, the at least one branch signal utilized channel corresponding to a wavelength of the at least one trunk signal unutilized channel, and the at least one trunk signal utilized channel corresponding to a wavelength of the at least one branch signal unutilized channel; and an optical add/drop multiplexer (OADM) coupled to the trunk path and the branch path for receiving the trunk signal and the branch signal and providing an output signal. The OADM includes: at least one filter configured to selectively filter a portion of at least one of the branch signal or the trunk signal in response to a command signal; and at least one coupler coupled to the at least one filter and configured to provide a WDM output signal including the at least one trunk signal utilized channel, the at least one branch signal utilized channel, and loading signals on all unutilized channels of the WDM output signal.

According to another aspect of the disclosure, there is provided an optical add/drop multiplexer including: a first input for receiving a WDM trunk signal from a trunk path, the trunk signal including at least one trunk signal utilized channel and at least one trunk signal unutilized channel; a second input for receiving a WDM branch signal from a branch path, the branch signal including at least one branch signal utilized channel and at least one branch signal unutilized channel, the at least one branch signal utilized channel corresponding to a wavelength of the at least one trunk signal unutilized channel, and the at least one trunk signal utilized channel corresponding to a wavelength of the at least one branch signal unutilized channel; at least one filter configured to selectively filter a portion of at least one of the branch signal or the trunk signal in response to a command signal; and at least one coupler coupled to the at least one filter and configured to provide a WDM output signal including the at least one trunk signal utilized channel, the at least one branch signal utilized channel, and loading signals on all unutilized channels of the WDM output signal.

According to yet another aspect of the disclosure, there is provided a method of maintaining loading of unutilized channels in a branched WDM optical network including: transmitting a WDM trunk signal on a trunk path, the trunk signal including at least one trunk signal utilized channel and at least one trunk signal unutilized channel; transmitting a WDM branch signal on a branch path, the branch signal including at least one branch signal utilized channel and at least one branch signal unutilized channel, the at least one branch signal utilized channel corresponding to a wavelength of the at least one trunk signal unutilized channel, and the at least one trunk signal utilized channel corresponding to a wavelength of the at least one branch signal unutilized channel; receiving the trunk signal and the branch signal at a branching unit; and selectively filtering a portion of at least one of the branch and trunk signals in the branching unit in response to a command signal to provide a WDM output signal including the at least one trunk signal utilized channel, the at least one branch signal utilized channel, and loading signals on all unutilized channels of the WDM output signal.

The embodiments that have been described herein, however, are but some of the several which utilize this invention and are set forth here by way of illustration but not of limitation. Many other embodiments, which will be readily apparent to those skilled in the art, may be made without departing materially from the spirit and scope of the invention as defined in the appended claims.

What is claimed is:
1. A wavelength division multiplexed (WDM) optical system comprising:
 a trunk terminal configured to provide a WDM trunk signal on a trunk path, said trunk signal comprising trunk signal utilized channels and trunk signal unutilized channels;

a branch terminal configured to provide a WDM branch signal on a branch path, said branch signal comprising branch signal utilized channels and branch signal unutilized channels, at least one of said branch signal utilized channels corresponding to a wavelength of at least one of said trunk signal unutilized channels, and at least one of said trunk signal utilized channels corresponding to a wavelength of at least one of said branch signal unutilized channels;

an optical add/drop multiplexer (OADM) coupled to said trunk path and said branch path for receiving said trunk signal and said branch signal and providing an output signal, said OADM comprising a first coupler configured to receive said trunk signal, said first coupler having a first output for dropping one or more of said trunk signal utilized channels and a second output comprising said trunk signal and a command signal, said OADM being configured to separate said command signal from said trunk signal;

at least one band-pass filter configured to receive at least one of said branch signal or said trunk signal and to selectively remove at least one band of channels from said one of said branch signal or said trunk signal in response to said command signal to provide a band pass filtered signal, said band of channels comprising a plurality of said branch signal utilized channels, a plurality of said branch signal unutilized channels, a plurality of said trunk signal utilized channels, or a plurality of said trunk signal unutilized channels; and at least one output coupler coupled to said at least one band-pass filter and configured to receive said band pass filtered signal and provide a WDM output signal comprising said at least one trunk signal utilized channel, said at least one branch signal utilized channel, and loading signals on all unutilized channels of said WDM output signal.

2. A system according to claim 1, wherein said at least one band-pass filter comprises a first filter set configured to selectively remove said plurality of trunk signal unutilized channels in response to said command signal and a second filter set configured to selectively remove said plurality of branch signal unutilized channels in response to said command signal.

3. A system according to claim 1, wherein said at least one band-pass filter comprises at least one variable optical amplifier (VOA) configured for attenuating said band of wavelengths in response to said command signal.

4. A system according to claim 1, wherein said at least one band-pass filter comprises
a first 3-port filter having a first output port coupled to a first optical path and a second output port coupled to a second optical path;
a first variable optical amplifier (VOA) coupled to said first optical path and configured for imparting a selected attenuation to a signal on said first optical path in response to said command signal;
a second VOA coupled to said second optical path and configured for imparting a selected attenuation to a signal on said second optical path in response to said command signal; and
a second 3-port filter having a first input coupled to said first optical path and a second input coupled to said second optical path, and an output port for providing a combined signal comprising signals received at said first and second inputs.

5. A system according to claim 1, wherein said trunk signal comprises said command signal.

6. A system according to claim 1, wherein said OADM comprises a command signal detection circuit configured for receiving said command signal and providing an output representative of said command signal to said at least one band-pass filter.

7. An optical add/drop multiplexer comprising:
a first input for receiving a WDM trunk signal from a trunk path, said trunk signal comprising trunk signal utilized channels and trunk signal unutilized channels;
a first coupler configured to receive said trunk signal, said first coupler having a first output for dropping one or more of said trunk signal utilized channels and a second output comprising said trunk signal and a command signal;
at least one filter coupled to said second output and configured to separate said command signal from said trunk signal;
a second input for receiving a WDM branch signal from a branch path, said branch signal comprising branch signal utilized channels and branch signal unutilized channels, at least one of said branch signal utilized channels corresponding to a wavelength of at least one of said trunk signal unutilized channels, and at least one of said trunk signal utilized channels corresponding to a wavelength of at least one of said branch signal unutilized channels;
at least one band-pass filter configured to receive at least one of said branch signal or said trunk signal and to selectively remove at least one band of channels from said one of said branch signal or said trunk signal in response to said command signal to provide a band pass filtered signal, said band of channels comprising a plurality of said branch signal utilized channels, a plurality of said branch signal unutilized channels, a plurality of said trunk signal utilized channels, or a plurality of said trunk signal unutilized channels; and
at least one output coupler coupled to said at least one band-pass filter and configured to receive said band pass filtered signal and provide a WDM output signal comprising said at least one trunk signal utilized channel, said at least one branch signal utilized channel, and loading signals on all unutilized channels of said WDM output signal.

8. An optical add/drop multiplexer according to claim 7, wherein said at least one band-pass filter comprises a first filter set configured to selectively remove said plurality of trunk signal unutilized channels in response to said command signal and a second filter set configured to selectively remove said plurality of branch signal unutilized channels in response to said command signal.

9. An optical add/drop multiplexer according to claim 7, wherein said at least one band-pass filter comprises at least one variable optical amplifier (VOA) configured for attenuating said band of wavelengths in response to said command signal.

10. An optical add/drop multiplexer according to claim 7, wherein said at least one band-pass filter comprises
a first 3-port filter having a first output port coupled to a first optical path and a second output port coupled to a second optical path;
a first variable optical amplifier (VOA) coupled to said first optical path and configured for imparting a selected attenuation to a signal on said first optical path in response to said command signal;

a second VOA coupled to said second optical path and configured for imparting a selected attenuation to a signal on said second optical path in response to said command signal; and a second 3-port filter having a first input coupled to said first optical path and a second input coupled to said second optical path, and an output port for providing a combined signal comprising signals received at said first and second inputs.

11. An optical add/drop multiplexer according to claim 7, wherein said trunk signal comprises said command signal.

12. An optical add/drop multiplexer according to claim 7, said optical add/drop multiplexer further comprising a command signal detection circuit configured for receiving said command signal and providing an output representative of said command signal to said at least one band-pass filter.

13. A method of maintaining loading of unutilized channels in a branched WDM optical network comprising:

transmitting a WDM trunk signal on a trunk path, said trunk signal comprising trunk signal utilized channels and trunk signal unutilized channels;

transmitting a WDM branch signal on a branch path, said branch signal comprising branch signal utilized channels and branch signal unutilized channels, at least one of said branch signal utilized channels corresponding to a wavelength of at least one of said trunk signal unutilized channels, and at least one of said trunk signal utilized channels corresponding to a wavelength of at least one of said branch signal unutilized channels;

receiving said trunk signal and said branch signal at a branching unit; and receiving said trunk signal at a first coupler having a first output for dropping one or more of said trunk signal utilized channels and a second output comprising said trunk signal and a command signal;

separating said command signal from said second output;

selectively band-pass filtering at least one of said branch signal or said trunk signal to selectively remove at least one band of channels from said one of said branch signal or said trunk signal in said branching unit in response to said command signal to provide a band pass filtered signal, said band of channels comprising a plurality of said branch signal utilized channels, a plurality of said branch signal unutilized channels, a plurality of said trunk signal utilized channels, or a plurality of said trunk signal unutilized channels;

coupling said band pass filtered signal to a output coupler to provide a WDM output signal comprising said at least one trunk signal utilized channel, said at least one branch signal utilized channel, and loading signals on all unutilized channels of said WDM output signal.

14. A method according to claim 13, wherein said selectively band-pass filtering comprises providing a first filter set configured to selectively remove said plurality of trunk signal unutilized channels in response to said command signal and a second filter set configured to selectively remove said plurality of branch signal unutilized channels in response to said command signal.

15. A method according to claim 13, wherein said selectively filtering comprises band-pass filtering said at least one of said branch signal or said trunk signal in a filter comprising at least one variable optical amplifier (VOA) configured for attenuating said band of wavelengths in response to said command signal.

16. A method according to claim 13, wherein said selectively filtering comprises band-pass filtering a portion of said at least one of said branch signal or said trunk signal in a filter comprising:

a first 3-port filter having a first output port coupled to a first optical path and a second output port coupled to a second optical path;

a first variable optical amplifier (VOA) coupled to said first optical path and configured for imparting a selected attenuation to a signal on said first optical path in response to said command signal;

a second VOA coupled to said second optical path and configured for imparting a selected attenuation to a signal on said second optical path in response to said command signal; and a second 3-port filter having a first input coupled to said first optical path and a second input coupled to said second optical path, and an output port for providing a combined signal comprising signals received at said first and second inputs.

17. A method according to claim 13, wherein said trunk signal comprises said command signal.

18. A method according to claim 13, wherein said branching unit comprises a command signal detection circuit configured for receiving said command signal and providing an output representative of said command signal to said at least one band-pass filter.

\* \* \* \* \*